(12) United States Patent
Myers

(10) Patent No.: US 11,774,097 B2
(45) Date of Patent: Oct. 3, 2023

(54) THERMAL RESISTANT AIR CAP

(71) Applicant: Delavan Inc., West Des Moines, IA (US)

(72) Inventor: Steve J. Myers, Norwalk, IA (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 0 days.

(21) Appl. No.: 17/825,381

(22) Filed: May 26, 2022

(65) Prior Publication Data

US 2022/0282868 A1    Sep. 8, 2022

Related U.S. Application Data

(63) Continuation of application No. 17/235,242, filed on Apr. 20, 2021, now Pat. No. 11,454,395.

(60) Provisional application No. 63/014,935, filed on Apr. 24, 2020.

(51) Int. Cl.

| F23R 3/14 | (2006.01) |
|---|---|
| F02C 7/22 | (2006.01) |
| F02C 7/236 | (2006.01) |
| F23R 3/28 | (2006.01) |

(52) U.S. Cl.
CPC .............. *F23R 3/14* (2013.01); *F02C 7/222* (2013.01); *F02C 7/2365* (2013.01); *F23R 3/283* (2013.01); *F23R 3/286* (2013.01)

(58) Field of Classification Search
CPC ................... F23R 3/283; F23R 3/14
See application file for complete search history.

(56) References Cited

U.S. PATENT DOCUMENTS

| 4,863,105 | A | 9/1989 | Bennett |
| 4,914,918 | A * | 4/1990 | Sullivan ................. F23R 3/283 60/800 |
| 6,363,724 | B1 | 4/2002 | Bechtel et al. |
| 7,007,864 | B2 | 3/2006 | Snyder et al. |
| 8,555,649 | B2 | 10/2013 | Patel et al. |
| 9,915,429 | B2 | 3/2018 | Toon et al. |
| 2011/0000214 | A1 | 1/2011 | Helmick et al. |
| 2012/0291444 | A1 | 11/2012 | Oskam |
| 2014/0020397 | A1 | 1/2014 | Nilsson |
| 2014/0174096 | A1 | 6/2014 | Milosavljevic |

(Continued)

FOREIGN PATENT DOCUMENTS

EP    3054219 A1    8/2016

OTHER PUBLICATIONS

Extended European Search Report dated Sep. 14, 2021, issued during the prosecution of European Patent Application No. EP 21170411.9.

*Primary Examiner* — Gerald L Sung
(74) *Attorney, Agent, or Firm* — Locke Lord LLP; Joshua L. Jones; Scott D. Wofsy

(57) ABSTRACT

An air cap is configured to be affixed to a nozzle assembly as a downstream facing component of the nozzle assembly. The air cap includes a plurality of air wipe passages with outlets defined in a circumferential direction around a downstream facing surface of the air cap. A nozzle assembly can include an outer wall wherein the air cap is connected to the nozzle assembly outboard of the outer wall. An inner wall can be connected to the outer wall by a plurality of air swirl vanes. One or more fuel circuit components can be connected to the nozzle assembly inboard of the inner wall.

15 Claims, 3 Drawing Sheets

(56) References Cited

U.S. PATENT DOCUMENTS

| | | |
|---|---|---|
| 2014/0202163 A1 | 7/2014 | Johnson et al. |
| 2014/0246518 A1 | 9/2014 | Myers |
| 2015/0285501 A1 | 10/2015 | DiCintio et al. |
| 2016/0003156 A1 | 1/2016 | Hanson |
| 2016/0230997 A1 | 8/2016 | Donovan et al. |
| 2016/0290291 A1 | 10/2016 | Prociw |
| 2016/0290651 A1 | 10/2016 | Donovan |
| 2017/0248318 A1* | 8/2017 | Kulkarni ................ F23R 3/46 |
| 2018/0010563 A1 | 1/2018 | Ryon et al. |
| 2018/0187891 A1* | 7/2018 | Mitani ................ F23R 3/343 |
| 2019/0086088 A1 | 3/2019 | Stevens et al. |
| 2019/0376690 A1 | 12/2019 | Niemeyer et al. |

* cited by examiner

THERMAL RESISTANT AIR CAP

CROSS REFERENCE TO RELATED APPLICATIONS

This is a continuation of U.S. patent application Ser. No. 17/235,242 filed Apr. 20, 2021, which claims priority to U.S. Provisional Patent Application Ser. No. 63/014,935, filed Apr. 24, 2020. The entire contents of both of these this related application are incorporated herein by reference.

BACKGROUND

1. Field

The present disclosure relates to nozzles and injectors and more particularly to air caps for injectors such as used for fuel injection in gas turbine engines.

2. Description of Related Art

Fuel injectors used in gas turbine engines have outlet surfaces that face into the high temperature combustion environment downstream of the fuel injectors. These surfaces can experience thermal damage due to recirculation of hot combustion gases in low air velocity areas of the combustor.

The conventional techniques have been considered satisfactory for their intended purpose. However, there is an ever present need for improved systems and methods for more thermal resistant injector surfaces. This disclosure provides a solution for this need.

SUMMARY

An air cap is configured to be affixed to a nozzle assembly as a downstream facing component of the nozzle assembly. The air cap includes a plurality of air wipe passages with outlets defined in a circumferential direction around a downstream facing surface of the air cap.

The air cap can define a central outlet orifice therethrough. The air wipe passages can define a plurality of concentric air wipe passage rings outletting on the downstream facing surface of the air cap. Each air wipe passage can extend from an interior surface of the air cap to the downstream facing surface of the air cap, winding in a helical direction about a spray axis of the air cap. The downstream facing surface of the air cap can include a circumferentially extending series of steps, each step defining a circumferentially facing outlet face from which one or more of the outlets emerge. There can be at least one radial cross-section of the air cap wherein the air wipe passages are layered at least two deep in an axial direction.

A nozzle assembly can include an outer wall wherein the air cap is connected to the nozzle assembly outboard of the outer wall. An inner wall can be connected to the wall by a plurality of air swirl vanes, straight vanes, and/or standoffs. One or more fuel circuit components can be connected to the nozzle assembly inboard of the inner wall. A gas fuel circuit can be defined inboard of the inner wall. One or more liquid circuits can be defined inboard of the gas fuel circuit. An air wipe feed passage can be defined between the outer wall and the air cap, wherein the air wipe feed passage is in fluid commination with the air wipe passages. The air wipe feed passage can optionally be connected to a gaseous fuel source to issue gaseous fuel through the air wipe passages. The air cap, inner wall, and outer wall can all be a single integral component. It is also contemplated that the air cap can be a separate component from the outer wall, wherein the air cap is mounted to the outer wall.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
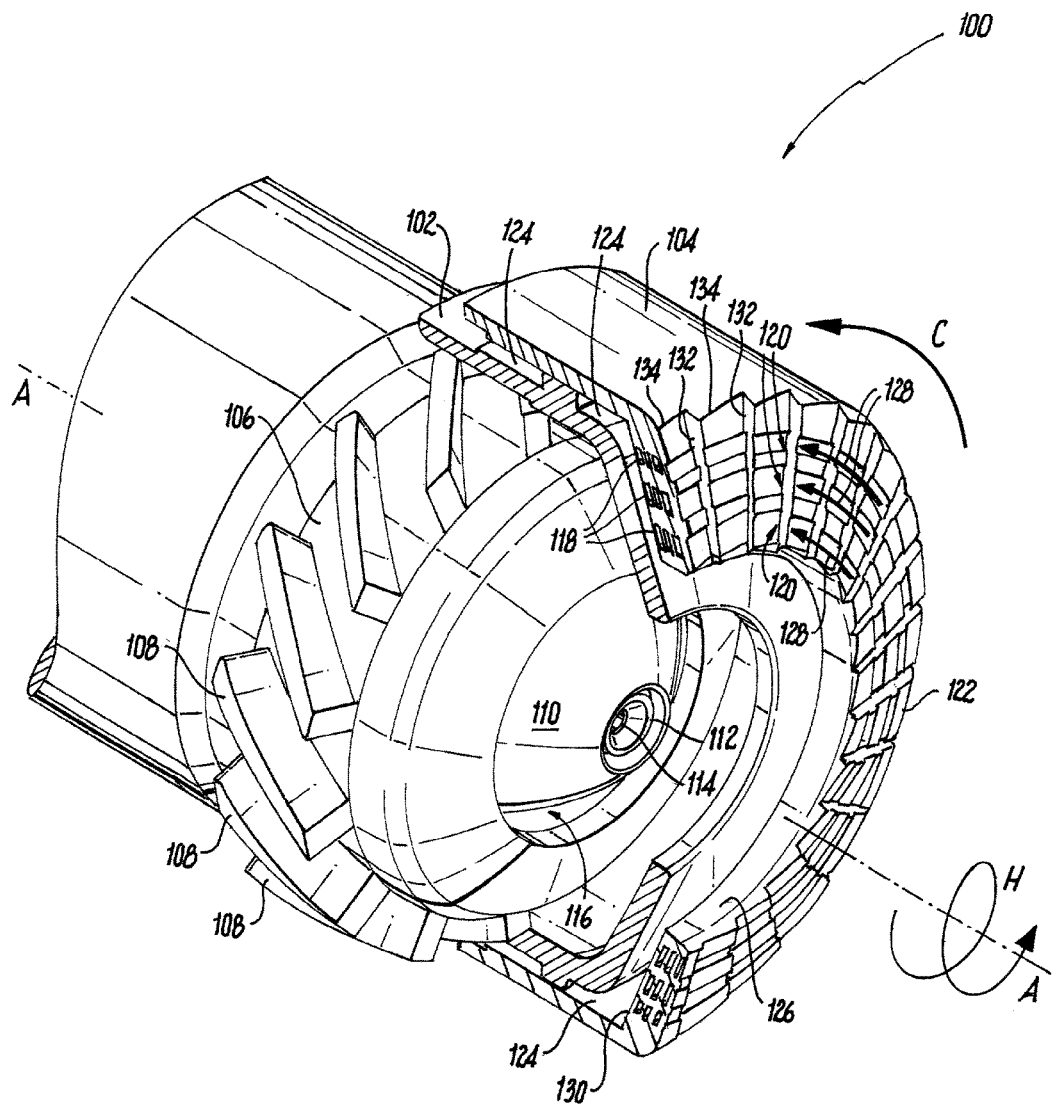
FIG. 1 is a partially cut away perspective view of an embodiment of a nozzle assembly constructed in accordance with the present disclosure, showing the air cap and air swirler outer wall in cross-section.

Reference will now be made to the drawings wherein like reference numerals identify similar structural features or aspects of the subject disclosure. For purposes of explanation and illustration, and not limitation, a partial view of an embodiment of a nozzle assembly in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used to provide wipe air or gas to the downstream facing surfaces of air caps in nozzle assemblies such as used in fuel injectors for gas turbine engines.

The nozzle assembly 100 includes an air swirler outer wall 102. An air cap 104 is connected to the nozzle assembly 100 outboard of the air swirler outer wall 102. An air swirler inner wall 106 is connected to the air swirler outer wall 102 by a plurality of air swirl vanes 108. In addition to or in lieu of swirl vanes 108, straight vanes or standoffs can be used. One or more fuel circuit components 110, 112, 114 are connected to the nozzle assembly 100 inboard of the air swirler inner wall 106. A gas fuel circuit 116 is defined inboard of the air swirler inner wall 106. Liquid fuel circuits are defined inboard of the gas fuel circuit 116, e.g. inboard of components 110 and 112, respectively.

The air cap 104 is affixed to the nozzle assembly 100 and is a downstream facing component of the nozzle assembly 100. The air cap 104 includes a plurality of air wipe passages 118 with outlets 120 defined in a circumferential direction C around a downstream facing surface 122 of the air cap 104. An air wipe feed passage 124 is defined between the air swirler outer wall 102 and the air cap 104. The air wipe feed passage 124 is in fluid commination with the air wipe passages 118 to supply air (e.g. T3 or compressor discharge air) for wiping the downstream facing surface 122 of the air cap 104. The air wipe feed passage 124 can optionally be connected to a gaseous fuel source to issue gaseous fuel through the air wipe passages 118, or the air wipe passages can be connected to a gaseous fuel source via a separate passage from the air wipe feed passage 124 (see, e.g., optional gas passage 138 in broken lines in FIG. 3).

Figure 2:
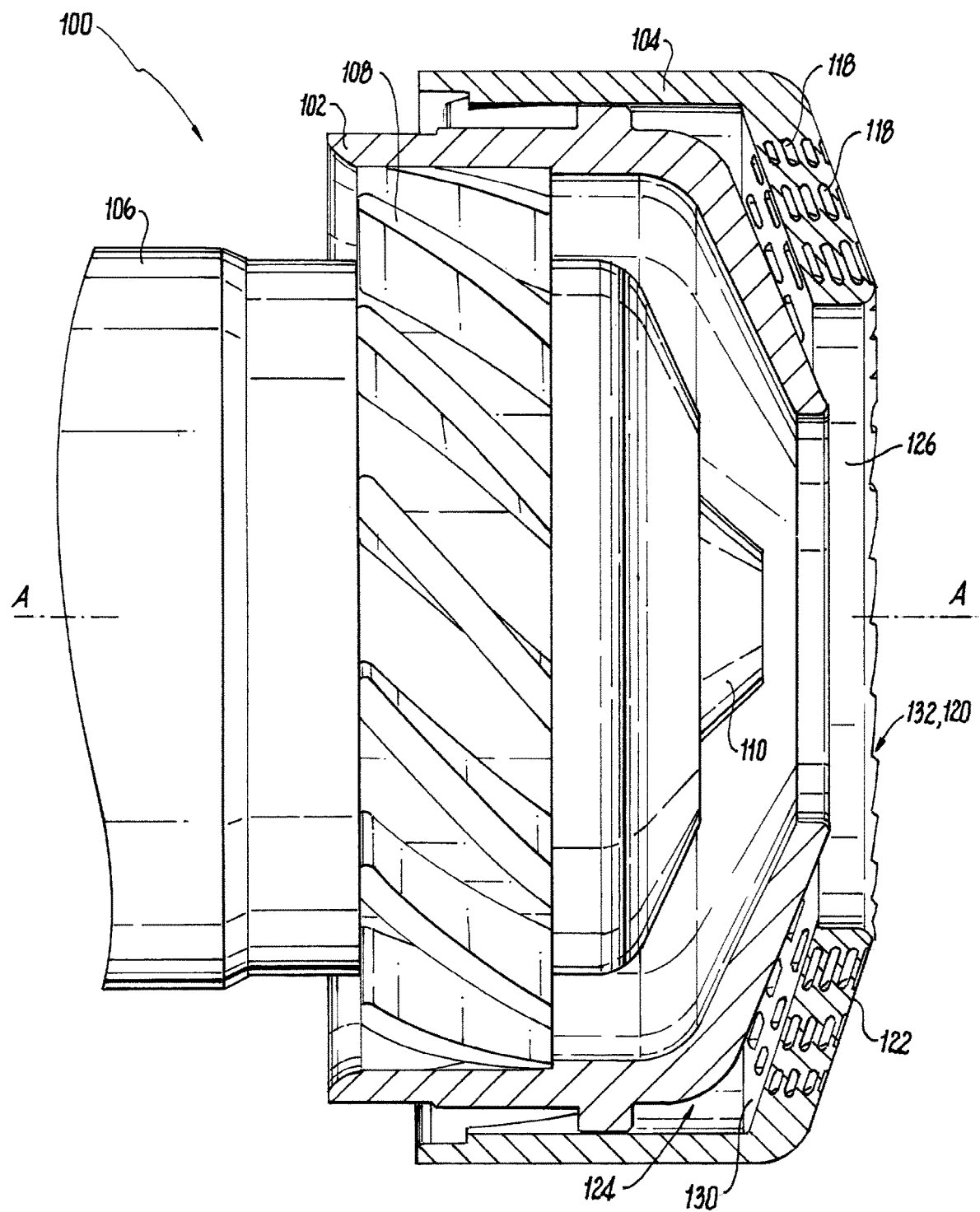
FIG. 2 is a cross-sectional side elevation view of a portion of the nozzle assembly of FIG. 1, showing the inlets of the air wipe passages.

The air cap 104 defines a central outlet orifice 126 therethrough. The air wipe passages 118 define a plurality of concentric air wipe passage rings 128 outletting on the downstream facing surface 122 of the air cap 104. In FIG. 1, there are three concentric air wipe passage rings 128, however those skilled in the art having had the benefit of this disclosure will readily appreciate that any suitable number of air wipe passage rings can be used without departing from the scope of this disclosure. Each air wipe passage 118 extends from an interior surface 130 of the air cap 104 to the downstream facing surface 122 of the air cap 104, winding in a helical direction H about a spray axis A of the air cap 104. The downstream facing surface 122 of the air cap 104 includes a circumferentially extending series of steps 134. Each step 134 defines a respective circumferentially facing outlet face 132 from which emerge one or more of the outlets 120 of the air wipe passages 118. There is at least one radial cross-section, e.g. the cross section shown in FIG. 1 or FIG. 2, of the air cap 104 wherein the air wipe passages 118 are layered at least two deep in the axial direction, i.e. along the spray axis A. In FIGS. 1 and 2, the cross-sections shown have the air wipe passages 118 layered three deep in the axial direction along axis A. This allows for internal cooling of the air cap 104.

Figure 3:
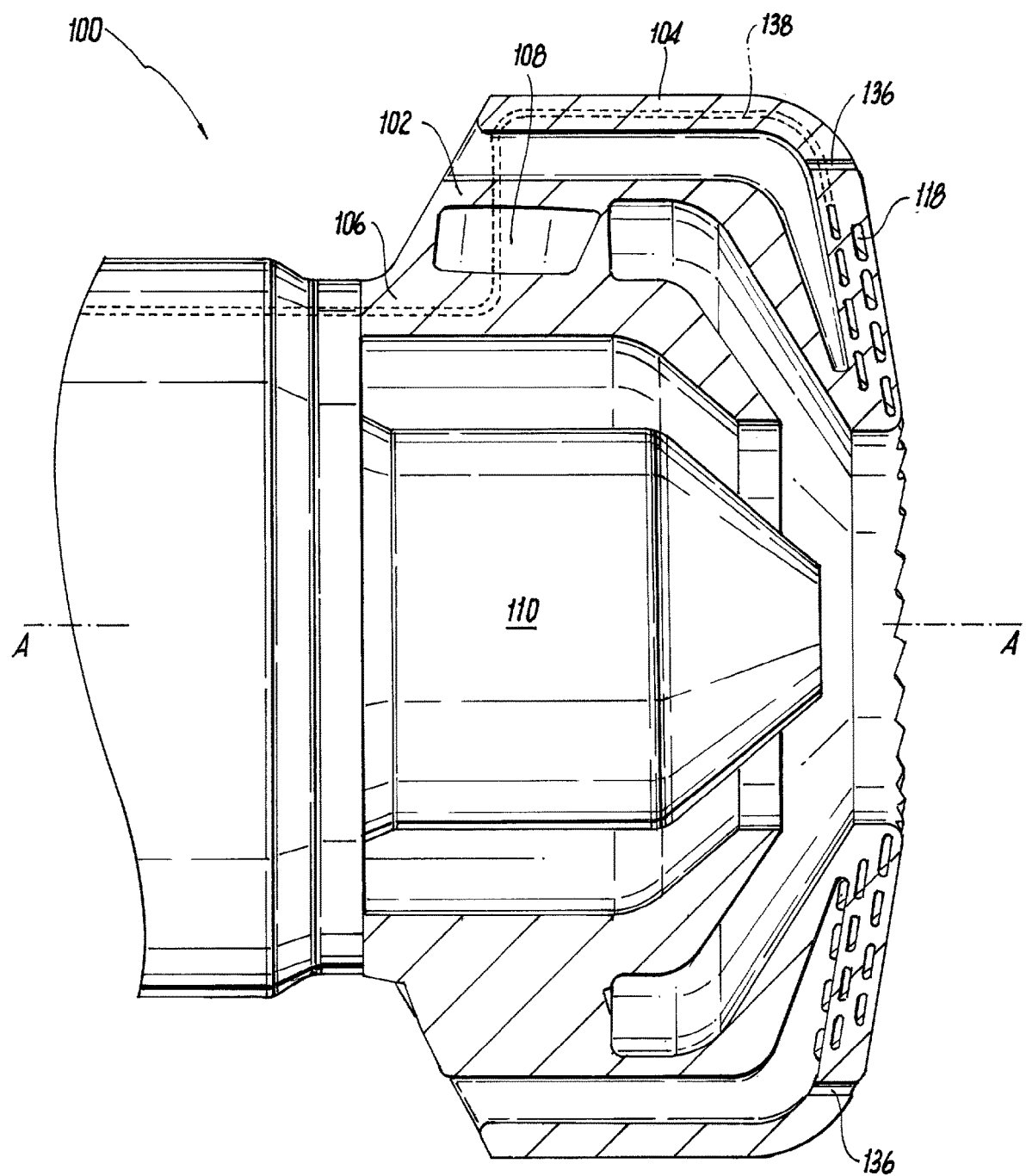
FIG. 3 is a cross-sectional side elevation view of a nozzle assembly like that in FIG. 1, showing an integral air cap and air swirler.

In FIGS. 1 and 2, the air cap 104 is a separate component from the air swirler outer wall 102, wherein the air cap 104 is mounted to the air swirler outer wall 102, e.g., by brazing. It is also contemplated that the air cap 104, air swirler inner wall 106, air swirler outer wall 102, and air swirl vanes 108 can all be a single integral component as shown in FIG. 3. This can be accomplished using additive manufacturing, for example. A plurality of purely axial oriented wipe orifices 136 can be included in addition to the circumferentially oriented air wipe passages 118.

The methods and systems of the present disclosure, as described above and shown in the drawings, can provide for air or gas issued directly to areas of recirculation by utilizing internal wipe passages, without requiring any changes to overall nozzle assembly envelope. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An apparatus comprising:
 an air cap configured to be affixed to a nozzle assembly as a downstream facing component of the nozzle assembly, wherein the air cap includes a plurality of air wipe passages with outlets defined in a circumferential direction around a downstream facing surface of the air cap, wherein the plurality of air wipe passages define a first ring of air wipe passages with outlets on the downstream facing surface of the air cap, and a second ring of air wipe passages with outlets on the downstream facing surface of the air cap, wherein the outlets of the second ring of air wipe passages are radially inward on the downstream facing surface from the outlets of the first ring of air wipe passages, wherein the downstream facing surface of the air cap includes a circumferentially extending series of steps, each step defining a circumferentially facing planar outlet face from which one or more of the outlets of the plurality of air wipe passages emerge, wherein each circumferentially facing planar outlet face includes one outlet of the first ring of air wipe passages and one outlet from the second ring of air wipe passages.

2. The apparatus as recited in claim 1, wherein each air wipe passage of the plurality of air wipe passages extends from an interior surface of the air cap to the downstream facing surface of the air cap, winding in a helical direction about a spray axis of the air cap.

3. The apparatus as recited in claim 1, further comprising the nozzle assembly including:
 an outer wall wherein the air cap is connected to the nozzle assembly outboard of the outer wall.

4. The apparatus as recited in claim 3, wherein the nozzle assembly further comprises:
 an inner wall connected to the outer wall by a plurality of air swirl vanes, straight vanes, and/or standoffs.

5. The apparatus as recited in claim 4, wherein the nozzle assembly further comprises one or more fuel circuit components connected to the nozzle assembly inboard of the inner wall.

6. The apparatus as recited in claim 5, wherein a gas fuel circuit is defined inboard of the inner wall.

7. The apparatus as recited in claim 6, wherein one or more liquid circuits are defined inboard of the gas fuel circuit.

8. The apparatus as recited in claim 7, wherein the air cap, the inner wall, and the outer wall are a single integral component.

9. The apparatus as recited in claim 5, wherein the air cap is a separate component from the outer wall, wherein the air cap is mounted to the outer wall.

10. The apparatus as recited in claim 5, wherein an air wipe feed passage is defined between the outer wall and the air cap, wherein the air wipe feed passage is in fluid commination with the plurality of air wipe passages.

11. The apparatus as recited in claim 10, wherein the air wipe feed passage is connected to a gaseous fuel source to issue gaseous fuel through the plurality of air wipe passages.

12. The apparatus as recited in claim 1, wherein the air cap defines a central outlet orifice therethrough.

13. The apparatus as recited in claim 1, wherein there is at least one radial cross-section of the air cap wherein the plurality of air wipe passages are layered at least two deep in an axial direction.

14. The apparatus as recited in claim 1, further comprising a third ring of air wipe passages with outlets on the downstream facing surface of the air cap, wherein the outlets of the third ring of air wipe passages are radially inward on the downstream facing surface from the outlets of the second ring of air wipe passages.

15. The apparatus as recited in claim 14, wherein each circumferentially facing planar outlet face includes one outlet of the third ring of air wipe passages.

* * * * *